United States Patent [19]

Seki

[11] 4,215,768
[45] Aug. 5, 1980

[54] CALIPER SUPPORTING DEVICE IN A DISC BRAKE FOR VEHICLES

[75] Inventor: Masayuki Seki, Tateshina, Japan

[73] Assignee: Nissin Kogyo Kabushiki Kaisha, Ueda, Japan

[21] Appl. No.: 10,158

[22] Filed: Feb. 7, 1979

[30] Foreign Application Priority Data

Mar. 18, 1978 [JP] Japan .................................. 53-31412

[51] Int. Cl.² ........................................... F16D 65/02
[52] U.S. Cl. .................................... 188/73.3; 188/26; 188/73.5
[58] Field of Search ....................... 188/26, 72.4, 73.3, 188/73.5; 308/238; 174/65 G, 152 R, 152 G

[56] References Cited

U.S. PATENT DOCUMENTS

| | | | |
|---|---|---|---|
| 2,145,744 | 1/1939 | Whitney | 174/152 R |
| 3,682,277 | 8/1972 | Brown | 188/73.3 |
| 3,997,034 | 12/1976 | Kellogg | 188/73.3 |
| 4,022,297 | 5/1977 | Haraikawa | 188/73.3 |

FOREIGN PATENT DOCUMENTS 2014468 10/1970 United Kingdom ..................... 188/73.3

*Primary Examiner*—Edward R. Kazenske
*Attorney, Agent, or Firm*—Haseltine, Lake & Waters

[57] ABSTRACT

A caliper supporting device in which a caliper is connected to a bracket through a first slide pin and a second slide pin so that the caliper arranged so as to sit astride of a part of the brake disc may be moved in a direction of a rotating axis of the brake disc. A resilient grommet for resiliently supporting the second slide pin only lengthwise thereof is mounted in a supporting hole in the form of an elongated hole. The second slide pin is directly brought into contact with a side wall of the supporting hole by a braking torque acting on the caliper.

2 Claims, 4 Drawing Figures

CALIPER SUPPORTING DEVICE IN A DISC BRAKE FOR VEHICLES

BACKGROUND OF THE INVENTION

1. Field of the Invention

The present invention relates, in a disc brake for vehicles such as bicycles, motorcycles and the like, to a caliper supporting device in which a caliper is connected to a bracket through a first slide pin and a second slide pin so that the caliper arranged so as to sit astride of a part of the brake disc may be moved in a direction of a rotating axis of the brake disc.

2. Description of the Prior Art

In conventional caliper supporting devices of the type as described above, a supporting hole for a second slide pin is formed sufficiently large in diameter in anticipation of variation in distance between axes of the aforementioned two slide pins and distance between axes of supporting holes into which the slide pins are fitted. With this arrangement, however, the second slide pin vibrates within the large-diameter supporting hole to beat side walls thereof and as a result, there occurs an inconvenience to generate the beating sounds. In order to avoid sounds, therefore, there is fitted a resilient cylindrical grommet in the entire peripheral edge of the large-diameter supporting hole. In this case, however, one side portion of the grommet is sometimes squeezed to damage between the second slide pin and the supporting hole thereof by the action of a great braking torque transmitted to the caliper from the brake disc when sudden braking takes place, thus posing a problem of the durability of the grommet.

SUMMARY OF THE INVENTION

It is therefore an object of the present invention to provide a simple and effective caliper supporting device which can overcome those inconveniences noted above with respect to prior art devices.

DETAILED DESCRIPTION OF THE PREFERRED EMBODIMENT

Figure 1:
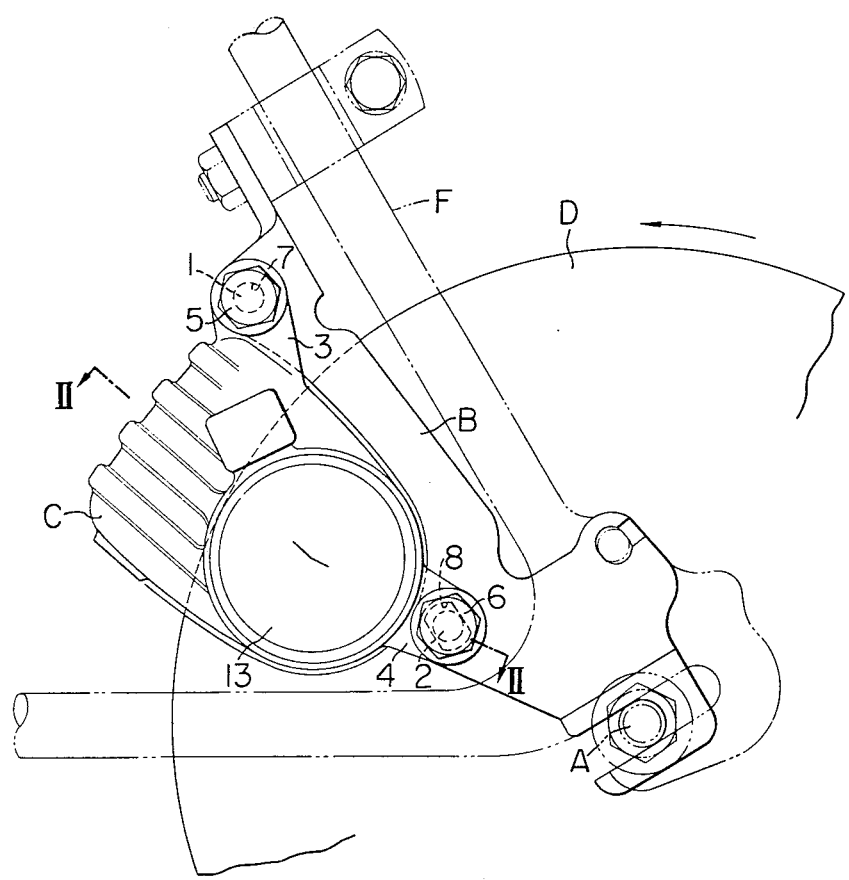
FIG. 1 is a side view of a disc brake for a bicycle provided with the device in accordance with the present invention.

In the following, embodiments of the present invention will be described with reference to the drawings.

In the illustrated embodiment, the present invention is applied to the disc brake for the bicycle. Reference character F indicates a vehicle body of the bicycle for supporting a rear axle A, and D indicates a brake disc which rotates around the rear axle A integral with a rear wheel (not shown). A bracket B fixed to the body F is disposed on one side of the brake disc D, and a caliper C is connected to the bracket B through a first slide pin 1 and a second slide pin 2 spaced apart in a radial direction of the brake disc D.

The first and second slide pins 1 and 2 are composed of protruded forward ends of bolts 5 and 6 respectively threadably mounted on lugs 3 and 4 at upper and lower ends of the caliper C and are disposed in parallel with the rotating axis of the brake disc D. The bracket B is formed with a first supporting hole and a second supporting hole 7, 8 corresponding to the slide pins 1, 2, the first supporting hole 7 being formed into a circular hole into which the first slide pin 1 is rotatably and slidably received without a substantial play. On the other hand, the second supporting hole 8 is formed into an elongated hole which extends toward the center of the first supporting hole 7, into which elongated hole the second slide pin 2 is loosely fitted with the following resilient grommet 9 mounted to permit slidable movement of the second slide pin 2.

The resilient grommet 9 comprises a pair of right and left circular flanges 11, 11 having through holes 10 of substantially same diameter as that of the second slide pin 2 in the center thereof and a pair of upper and lower packings 12, 12 arranged in spaced opposed relation to each other with said through hole 10 disposed therebetween and connected with between the flanges 11, 11. The entire grommet is integrally formed of a resilient material such as rubber. The packings 12 and 12 are respectively filled between the second slide pin 2 and the end wall lengthwise of the second supporting hole 8. The flanges 11 and 11 clampingly hold both sides of the bracket B therebetween against disengagement of the packings 12 and 12, each through hole 10 of the flange 11 and 11 receiving therein the second slide pin 2. Thus, the second slide pin 2 is resiliently supported in the second supporting hole 8 by the packings 12 and 12, the working error of the distance between axes of the slide pins 1, 2 and the distance between axes of the supporting holes 7 and 8 is accommodated by resilient deformation of the packings 12 and 12.

The aforementioned caliper C has a pair of right and left arms 13 and 14 sitting astride of a part of the brake disc D, the left arm 13 being formed with a hydraulic cylinder 15 in communication with the brake master cylinder (not shown), and a pair of right and left friction pads 17 and 18 opposedly arranged for clamping the brake disc D therebetween are respectively secured to a piston 16 within the hydraulic cylinder 15 and the right arm 14.

Figure 2:
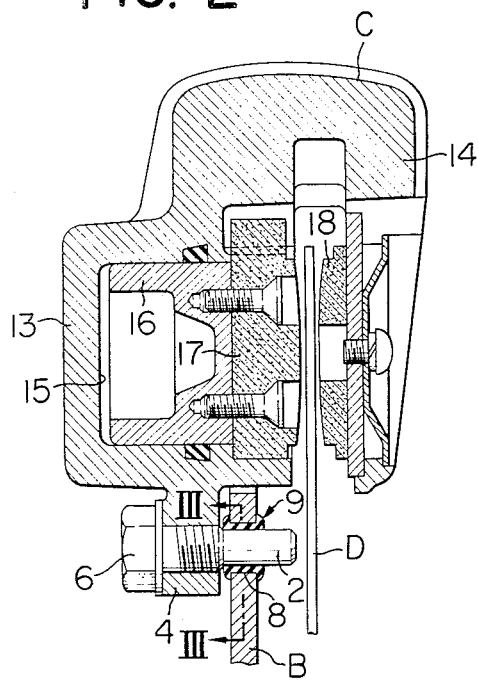
FIG. 2 is a sectional view taken along the line II—II of FIG. 1.
Figure 3:
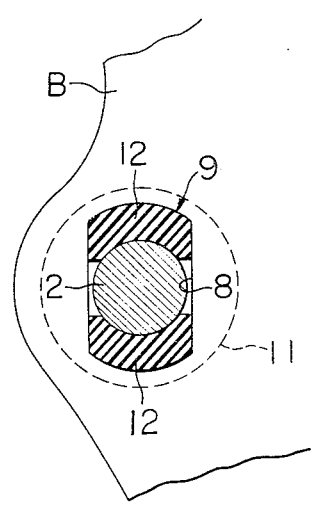
FIG. 3 is an enlarged view in section taken along the line III—III of FIG. 2.
Figure 4:
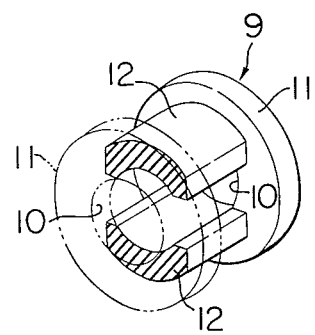
FIG. 4 is a partially cutaway perspective view of a resilient grommet.

Next, the operation of the above-mentioned embodiment will be described. When working oil is fed under pressure from the brake master cylinder to the hydraulic cylinder 15 during the rotation of the brake disc D, the oil pressure thereof causes the rightward movement of the piston 16 in FIG. 2 to bring the friction pad 17 into pressure contact with the left side surface of the brake disc D and at the same time the reaction thereof causes the leftward movement of the caliper C while sliding the slide pins 1 and 2 along the supporting holes 7 and 8 to bring the friction pad 18 into pressure contact with the right side surface of the brake disc D, the brake disc D being placed in frictional contact with the friction pads 17 and 18 to be braked.

During the aforesaid braking, the caliper C is subject to a turning force about the first slide pin 1 fitted in the first supporting hole 7 by the braking torque transmitted from the brake disk D through the friction pads 17 and 18. As this occurs, the second slide pin 2 loosely fitted in the second supporting hole 8 merely slightly deforms the packings 12 and 12 of the resilient grommet 9, immediately after which the second slide pin directly comes into contact with the side wall of the second supporting hole 8, that is, with the bracket B, and hence, it is possible to positively support the caliper C without applying an undue load to the packings 12 and 12 and to transmit the braking torque to the bracket B.

Since, at the time of non-braking, the second slide pin 2 is resiliently supported by the packing 12 and 12 of the resilient grommet 9 as previously mentioned, it is possible to prevent generation of sounds caused by beating the side walls of the second supporting hole 8 resulting from vibrations of the second slide pin 2 therein during the running of the vehicle.

In the present invention, alternatively, the slide pins 1 and 2 may be disposed on the bracket B and the supporting holes 7 and 8 disposed in the caliper C.

As described above, the present invention may provide a very simple construction in which in the supporting hole in the form of an elongated hole, there is mounted the resilient grommet for resiliently supporting the second slide pin only lengthwise of said hole and therefore, it is possible to simultaneously accomodate for the working error in the distance between axes of the first and second slide pins and the distance between axes of the supporting holes into which said pins are received, to prevent damage given to the resilient grommet and to prevent vibrations of the second slide pin, thereby materially enhancing the quality of the disc brake without bringing about higher cost.

While only one presently perferred embodiment of the invention has been shown and described, it will be apparent to those skilled in the art that many changes and modifications may be made therein without departing from the spirit or scope of the invention as defined in the appended claims.

What is claimed is:

1. An improved caliper supporting device in a disc brake for vehicles, comprising; a bracket secured to a body of a vehicle, a caliper arranged astride of a part of a brake disc and being pivotally and slidably supported at one end thereof on said bracket by a first slide pin, said first slide pin extending in a direction of the axis of rotation of said brake disc, a second slide pin fixedly mounted on one of the other end of said caliper and said bracket, said second slide pin extending in the direction of the axis of rotation of said brake disc and being adapted to loosely fit in a support hole in the other of said other end of said caliper and said bracket, and a resilient grommet mounted in said support hole for resiliently supporting said second slide pin and thereby slidably supporting said other end of said caliper on said bracket, the improvement comprising: having said support hole formed as an elongated hole extending in a direction toward said first slide pin to thereby provide a clearance space between the second slide pin and the ends of said elongated hole; said resilient grommet being disposed in said clearance spaces to resiliently support said second slide pin only in the lengthwise direction of said elongated hole; and said grommet being opened sidewise of said elongated hole for permitting direct engagement of said second slide pin with the side walls of said elongated hole, when a braking torque is applied to the caliper.

2. A caliper supporting device according to claim 1, wherein said resilient grommet comprises a pair of right and left circular flange portions each having in the center thereof a through hole of substantially the same diameter as said second slide pin and a pair of opposed upper and lower packings arranged in spaced opposite relation to each other with said through hole disposed therebetween and connected with said flange portions, said packings being disposed in said clearance spaces, said flange portions serving to clampingly hold said resilient grommet against disengagement from said elongated hole.

* * * * *